United States Patent [19]
Habrard

[11] Patent Number: 5,212,945
[45] Date of Patent: May 25, 1993

[54] POST-COMBUSTION DEVICE WITH PIVOTING FLAPS

[75] Inventor: Alain G. J. Habrard, Saint Martin en Biere, France

[73] Assignee: Societe Nationale d'Etude et de Construction de Moteurs d'Aviation "S.N.E.C.M.A.", Paris, France

[21] Appl. No.: 833,787

[22] Filed: Feb. 12, 1992

[30] Foreign Application Priority Data

Feb. 13, 1991 [FR] France .................. 91 01641

[51] Int. Cl.$^5$ ............................................. F02H 3/02
[52] U.S. Cl. .................... 60/226.1; 60/226.3; 60/261
[58] Field of Search ............... 60/226.1, 226.3, 261, 60/264, 737, 738, 749

[56] References Cited

U.S. PATENT DOCUMENTS

| | | | |
|---|---|---|---|
| 3,118,276 | 1/1964 | Keenan et al. | 60/261 |
| 3,439,504 | 4/1969 | Logerot et al. | 60/264 |
| 4,285,194 | 8/1981 | Nash | 60/261 |
| 4,409,788 | 10/1983 | Nash et al. | 60/226.3 |
| 4,638,631 | 1/1987 | Debeneix et al. | 60/226.3 |
| 4,899,539 | 2/1990 | Gastebois et al. | 60/749 |
| 4,926,633 | 5/1990 | Nash et al. | 60/226.1 |

FOREIGN PATENT DOCUMENTS

| | | |
|---|---|---|
| 1086315 | 2/1955 | France . |
| 2626044 | 7/1989 | France . |
| 928996 | 6/1963 | United Kingdom . |
| 1208520 | 10/1970 | United Kingdom . |
| 2048387 | 12/1980 | United Kingdom . |

Primary Examiner—Richard A. Bertsch
Assistant Examiner—Howard R. Richman
Attorney, Agent, or Firm—Oblon, Spivak, McClelland, Maier & Newstadt

[57] ABSTRACT

A post-combustion device through which flows two concentric streams, one of which is a primary flow of air flowing into the internal stream and the other of which is a flow of secondary air flowing into the external stream. The device includes a plurality of flame stabilizing radial arms extending through the internal stream and a plurality of pivoting flaps, wherein the flaps assume a normal position when they separate the streams and a slanted position where they direct the flow of secondary air towards the primary flow. The flaps include a mechanism for pivoting the flaps on the arms and each flap extends between two adjacent arms. The flaps almost fully obstruct the external stream when in the slanted position.

5 Claims, 2 Drawing Sheets

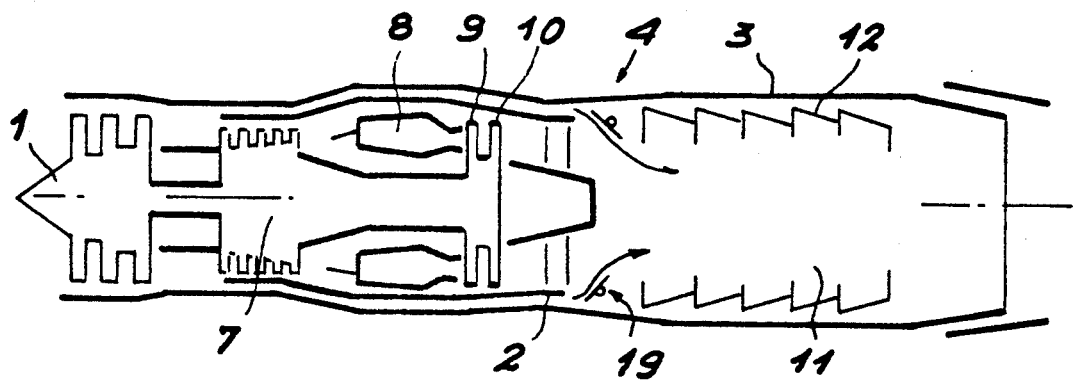

POST-COMBUSTION DEVICE WITH PIVOTING FLAPS

FIELD OF THE INVENTION

The invention concerns a post-combustion device comprising pivoting flaps.

BACKGROUND OF THE INVENTION

Certain turbojets are provided with post-combustion devices by which an additional thrust may be given in certain special circumstances, especially during jet-assisted take-off. The air passing through the turbojet is separated upstream of the post-combustion device into one internal stream of hot air and one external stream of cold air concentric to the hot air stream. Pivoting flaps may be used in double-flow engines so as to adjust the dilution rate, both in cases of functioning where post-combustion is inactive and in those cases where post-combustion is ignited, generally by modifying the conditions or junction locations of the two streams.

One example of the prior art exists in the French patent application No. 2 626 044 in which the pivoting flaps have a double function of masking or uncovering a fuel injection ramp while creating in the latter state an excess pressure making it possible to supercharge scoops with cold air, these scoops directing this air towards fuel injection radial arms traversing the internal stream.

SUMMARY OF THE STREAM

In the invention, the pivoting flaps are placed in a different way and are mainly used to impose an almost complete mixture of the two streams in the operating conditions of the turbojet where post-combustion is extinguished and an almost full separation of the two streams exists when post-combustion is ignited wherein the mixture of the streams is brought downstream of post-combustion fuel injection means. Much greater contrast between the two flow states is thus obtained with respect to the prior art.

Thus, the invention consists of a post-combustion device including two concentric streams, one primary air flow flowing into the internal stream and a secondary flow of air flowing into the external stream, and radial arms provided with fuel injectors extending through the internal stream and pivoting flaps, wherein the flaps are able to take up a position able to be used when post-combustion is active where they separate the streams, and inclined positions where they direct the air from the secondary flow towards the primary flow. These flaps, mounted, for pivoting on the arms, each extend between two arms, and, in the inclined position, fully obstruct the external stream by freeing passages so as to force the secondary flow to penetrate the primary flow. The arms also extend through the external stream. It ought to be mentioned that the flaps are slanted when post-combustion is active in the aforesaid prior art.

As in the prior art, the device may also comprise a ramp for injecting fuel into the external stream downstream of the arms.

The flaps may advantageously include one portion disposed in such a way as to partially obstruct the internal stream in the normal position.

BRIEF DESCRIPTION OF THE DRAWINGS

The invention is now to be described in detail with the aid of the accompanying figures, this description being given by way of non-restrictive illustration wherein:

FIG. 1 shows a diagram of a turbojet provided with a post-combustion device;

FIG. 2 shows a longitudinal section of the post-combustion device, and

DETAILED DESCRIPTION OF THE PREFERRED EMBODIMENTS

Figure 3:
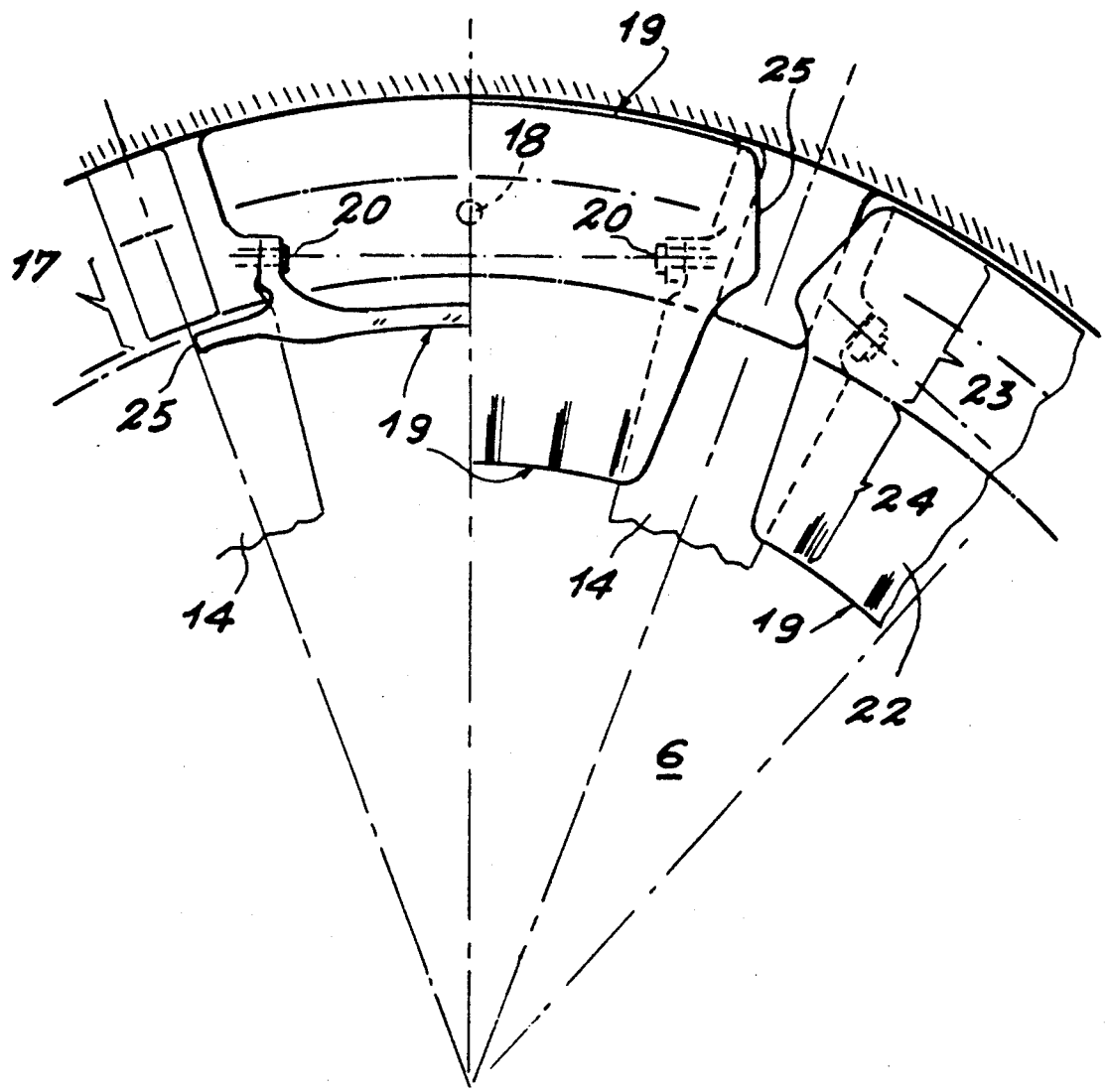
FIG. 3 shows an axial view of the post-combustion device.

The turbojet includes a low pressure compressor 1 by which air enters the turbojet and undergoes a first compression. The air is then divided into two concentric streams separated by a jacket 2 coaxial to the casing 3 of the turbojet and which extend as far as the post-combustion device 4. The external stream 5 situated between the jacket 2 and the casing 3 is traversed by the relatively cold air directly arriving at the post-combustion device 4, whereas the air passing into the internal stream 6 surrounded by the jacket 2 firstly passes through a high pressure compressor 7, a combustion chamber 8 wherein it receives energy, two turbines 9 and 10 for driving the two compressors 1 and 7, and finally arrives at the post-combustion device 4. The hot and cold air flows traverse a post-combustion channel 11 before coming out of the turbojet. The post-combustion channel 11 is delimited by a cooling jacket 12 which the casing 3 encompasses a short distance away.

Reference is now made to FIGS. 2 and 3. Flame stabilizer arms 14 extend radially through the streams 5 and 6 and are secured to the casing 3. It may include fuel injection nozzles 15 in the internal stream 6 and stop not far from a conical wall 16 which becomes thin in the direction of the post-combustion channel 11, this wall being interrupted in front of it and is used to internally delimit the internal stream 6 at the location of the post-combustion device 4. A flame holder has also been provided and a fuel injection ramp constituted by a gutter 17 disposed as a ring and secured to the radial arms 14 so as to heat the cold air of this stream. This figure shows fuel intake pipes 18 for admitting fuel into the radial arms 14 and the gutter 17. These pipes end via their other extremity at a fuel tank provided with fuel by a pump outside the casing 3. These means are normally used when implementing this technique and are independent of the invention.

Pivoting flaps 19 are provided. They are controlled by a jack system (not shown) and may assume diverse forms, but it is also possible to adopt any suitable control system, such as a control ring sliding between the casing 3 and the cooling jacket 12 without obstructing the section delimited and connected to the flaps 19 by articulated levers, as in British patent No. 2 048 387. One example of jacks used is the one appearing in the French patent application mentioned earlier where the jacks are joined by their rod to one extremity of the flaps and by their cylinder to a fixed point which may be situated on the jacket 2 or the casing 3. The flaps 19 rotate around two bearings 20 situated on adjacent radial arms 14. They are composed of lugs 21 fastened to the bearings 20 which are connected to a plate 22 constituting the control portion of the flaps 19. As can be seen on FIG. 3, the plate 22 is composed of one enlarged front portion 23 and one narrower rear portion 24.

FIGS. 2 and 3 show the flaps in their two principal states, but they may also take up all intermediate states according to flight conditions and the desired power the turbojet needs so as to produce and seek the optimal adaptation of the functioning of the components. In the maximum slanting position, the flaps 19 are directed almost parallel to the radial arms 14 (at the right on FIG. 3). It shall be observed that they almost fully obstruct the intervals between the radial arms 14 at the location of the external stream 5 since the enlarged front portions 23 are wider than said arms, that is they become forced to direct the flow of cold air towards the internal stream 6 wherein it is mixed with the flow of hot air in front of the radial arms 14. Almost nothing is lost in passing outside the cooling jacket 12.

In the normal position, especially with active post-combustion, the flaps 19 are directed axially and the plates 22 are aligned with the jacket 21 as shown in phantom lines in FIG. 2. The junction between the streams 5 and 6 is rejected into the post-combustion channel 11. The cold air laps the gutter 17 which, fed with fuel in this state, allows the cold air in the post-combustion mode to be heated. One portion of the cold air is nevertheless used to cool the casing 3, which is then necessary, and the position reached by the flaps 19 allows for a free flow between the casing 3 and the cooling jacket 12.

The left portion of FIG. 3 shows the lateral edges 25 of the enlarged portions meet in the post-combustion state. Moreover, the narrower rear portions 24, partly as shown as blocking the internal stream 6 in the slanted position, which contributes in masking the turbines while reducing their infrared radiation.

What is claimed is:

1. A post-combustion device through which flows two concentric streams, one of which is a primary flow of air flowing into the internal stream and the other of which is a flow of secondary air flowing into the external stream which device comprises:
   a plurality of flame stabilizing radial arms extending through the internal stream;
   a plurality of pivoting flaps, wherein the flaps assume a normal position when they separate the streams and a slanted position when they direct the flow of secondary air towards the primary flow said flaps including means for pivoting said flaps on the arms and each flap extending between two adjacent arms, and wherein the flaps almost fully obstruct the external stream when in said slanted position.

2. A post-combustion device according to claim 1, which comprises fuel injection means for injecting fuel into the external stream.

3. A post-combustion device according to claim 1, wherein the flaps include portions disposed in such a way as to partially obstruct the internal stream when in said slanted position.

4. A post-combustion device according to claim 1, wherein the flaps include lateral edge portions substantially joining one another when in said normal position.

5. A post-combustion device according to claim 1, which comprises a jacket for separating said streams wherein the flaps each include a plate wherein said plates of said flaps in said normal position are aligned with said jacket and separate the streams.

* * * * *